United States Patent
Patel et al.

(10) Patent No.: US 11,132,100 B1
(45) Date of Patent: *Sep. 28, 2021

(54) 4D INTERACTIVE MISSION ANALYTICS FOR VISUALIZATION OF UNMANNED VEHICLE PERFORMANCE INDICATORS

(71) Applicant: NORTHROP GRUMMAN SYSTEMS CORPORATION, Falls Church, VA (US)

(72) Inventors: Miteshkumar K. Patel, San Marcos, CA (US); Louis Oddo, Carlsbad, CA (US); William Parsons, Valley Center, CA (US); Feng Cao, San Diego, CA (US); Henry H. Fung, San Diego, CA (US); Devang R. Parekh, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/283,019

(22) Filed: Feb. 22, 2019

Related U.S. Application Data (63) Continuation of application No. 15/204,690, filed on Jul. 7, 2016, now Pat. No. 10,261,652.

(51) Int. Cl.
| | |
|---|---|
| *G06F 3/0481* | (2013.01) |
| *G05D 1/00* | (2006.01) |
| *G06F 3/01* | (2006.01) |
| *G06F 3/16* | (2006.01) |
| *G06F 3/0484* | (2013.01) |

(52) U.S. Cl.
CPC ......... *G06F 3/0481* (2013.01); *G05D 1/0044* (2013.01); *G06F 3/013* (2013.01); *G06F 3/017* (2013.01); *G06F 3/04847* (2013.01); *G06F 3/167* (2013.01)

(58) Field of Classification Search
CPC .... G06F 3/0481; G06F 3/167; G06F 3/04847; G06F 3/017; G06F 3/013; G05D 1/0044
See application file for complete search history.

(56) References Cited

U.S. PATENT DOCUMENTS

| | | | |
|---|---|---|---|
| 10,001,776 B2 * | 6/2018 | Rangarajan | G05D 1/0055 |
| 10,296,862 B1 * | 5/2019 | Oddo | G06Q 10/06395 |
| 2005/0004723 A1 * | 1/2005 | Duggan | B64C 19/00 |
| | | | 701/24 |
| 2006/0184292 A1 * | 8/2006 | Appleby | F41H 13/00 |
| | | | 701/23 |

(Continued)

*Primary Examiner* — Phenuel S Salomon
(74) *Attorney, Agent, or Firm* — Tarolli, Sundheim, Covell & Tummino LLP (57) ABSTRACT

A system includes an analytics collector that receives world state data to provide status relating to a plurality of mission analytics of an unmanned vehicle or an unmanned vehicle mission planner. An asset filter filters the status from the analytics collector with respect to mission analytics of a subset of selected assets. An analytic aggregator collects the filtered status from the asset filter and generates a visual analytics file based on one or more selected analytics for the subset of selected assets. A rendering pipeline processes the visual analytics file from the analytic aggregator and generates a formatted output file describing a visualization of the plurality of mission analytics from the visual analytics file.

20 Claims, 8 Drawing Sheets

(56) References Cited

U.S. PATENT DOCUMENTS

| | | | |
|---|---|---|---|
| 2006/0229773 A1* | 10/2006 | Peretz | A62C 27/00 |
| | | | 701/23 |
| 2009/0076665 A1 | 3/2009 | Hoisington et al. | |
| 2010/0084513 A1 | 4/2010 | Ryan et al. | |
| 2010/0269143 A1* | 10/2010 | Rabowsky | H04N 7/20 |
| | | | 725/63 |
| 2011/0085033 A1* | 4/2011 | McDonald | H04N 7/18 |
| | | | 348/143 |
| 2012/0038633 A1* | 2/2012 | Clark | G06T 17/05 |
| | | | 345/419 |
| 2014/0032013 A1 | 1/2014 | Riley | |
| 2014/0236390 A1* | 8/2014 | Mohamadi | B64C 29/00 |
| | | | 701/2 |
| 2014/0316616 A1* | 10/2014 | Kugelmass | G06T 11/206 |
| | | | 701/8 |
| 2014/0324253 A1* | 10/2014 | Duggan | G05D 1/0088 |
| | | | 701/3 |
| 2015/0170524 A1* | 6/2015 | Stefani | G05D 1/0027 |
| | | | 701/120 |
| 2015/0234387 A1* | 8/2015 | Mullan | G05D 1/104 |
| | | | 701/3 |
| 2015/0323699 A1* | 11/2015 | Gariepy | G05B 15/00 |
| | | | 702/2 |
| 2016/0260331 A1* | 9/2016 | Salentiny | G08G 5/0013 |
| 2019/0043201 A1* | 2/2019 | Strong | G06K 9/00624 |

* cited by examiner

4D INTERACTIVE MISSION ANALYTICS FOR VISUALIZATION OF UNMANNED VEHICLE PERFORMANCE INDICATORS

RELATED APPLICATIONS

This application is a continuation application claiming priority from U.S. patent application Ser. No. 15/204,690, filed 7 Jul. 2016, which is incorporated herein in its entirety.

TECHNICAL FIELD

This disclosure relates to unmanned vehicle interfaces, and more particularly to dynamic visualization of performance indicators for manned and unmanned vehicles or vehicle swarms that include manned and unmanned teams over selected time periods.

BACKGROUND

Typical mission plan interface software for a general manned or unmanned vehicle allows operators to plan the tasks to be executed by each vehicle via a graphical user interface that includes various input and output options for feedback and control of the planning process. The graphical user interface typically provides a three-dimensional presentation that includes latitude, longitude, and altitude information in the display output relating to a proposed mission plan during pre-mission planning and also allows monitoring and control of real-time mission progress during mission execution. This includes updating way points, aborting plans, allowing manual override, and so forth. Typical graphical user interfaces to existing mission planning and control systems have limited abilities to analyze how changes to the current environment will impact tasks planned for execution in the future. This usually consists of limited abilities to visually compare the current iteration of a single plan for a single vehicle with the previous iteration of the same plan. Comparison is typically performed visually by a human operator comparing the route and each individual task within the mission plan against defined mission success criteria. Some methods attempt to provide computational metrics that quantify the performance of one or more aspects of the mission plan. These current methods are slow and manually cumbersome at evaluating the mission plan's performance for a single vehicle. Current methods are also typically tied to a single mission planner designed for a single specific vehicle further restricting their ability to evaluate alternatives for other vehicles of the same domain type or other vehicles of different domain types.

The current state of vehicle interface software creates a bottleneck when planning and managing the execution of a plurality of vehicles as each plan for each vehicle must be manually coordinated with the plans of all other vehicles involved in satisfying the same set of tasks. This bottleneck becomes a serious constraint when the number of vehicles exceeds two or three and is further exacerbated when the plurality of vehicles is heterogeneous (of different types) and a mixture of manned and unmanned teams.

SUMMARY

This disclosure relates to dynamic visualization of performance indicators for manned and unmanned vehicles or vehicle swarms of manned and unmanned teams over selected time periods. In one aspect, a system includes a memory to store computer-executable components and a processor to execute the computer-executable components from the memory. The computer-executable components include an analytics collector that receives world state data to provide status relating to a plurality of mission analytics of an unmanned vehicle or an unmanned vehicle mission planner. The mission analytics relate to the ability of the unmanned vehicle and its associated payload resources to execute a given mission plan. An asset filter filters the status from the analytics collector with respect to mission analytics of a subset of selected assets. An asset selector specifies the subset of selected assets to the asset filter. An analytic aggregator collects the filtered status from the asset filter and generates a visual analytics file based on one or more selected analytics for the subset of selected assets.

An analytic selector specifies the one or more selected analytics to the analytic aggregator. A rendering pipeline processes the visual analytics file from the analytic aggregator and generates a formatted output file describing a visualization of the plurality of mission analytics from the visual analytics file. The formatted output file is generated as a collection of display objects. Each of the display objects represent at least one mission analytic from the one or more selected analytics of the subset of selected assets. Each of the specified display objects represent a current or future status of the mission analytics over a specified time window.

In another aspect, a non-transitory computer readable medium having computer executable instructions stored thereon. The computer executable instructions to provide status relating to a plurality of mission analytics of a plurality of unmanned vehicles and a plurality of unmanned vehicle mission planners. The mission analytics relate to the ability of the plurality of unmanned vehicles and their respective payload resources to execute a respective mission plan or respective alternative mission plan generated by the plurality of unmanned vehicle mission planners. The instructions filter the status with respect to mission analytics of a subset of selected assets and specify the subset of selected assets. The instructions collect the filtered status from the asset filter and generate a visual analytics file based on one or more selected analytics for the subset of selected assets. The instructions specify the one or more selected analytics. The instructions process the visual analytics file and generate a formatted output file describing a visualization of the plurality of mission analytics from the visual analytics file. The formatted output file is generated as a collection of display objects. Each of the display objects represent at least one mission analytic from the one or more selected analytics of the subset of selected assets. Each of the specified display objects represent a current or future status of the mission analytics over a specified time window.

In yet another aspect, a method includes providing status relating to a plurality of mission analytics of an unmanned vehicle or an unmanned vehicle mission planner. The mission analytics relate to the ability of the unmanned vehicle and its associated payload resources to execute a given mission plan. The method includes generating an analytics file from the status describing the plurality of mission analytics. The method includes generating a formatted output file from the analytics file describing a visualization of the plurality of mission analytics from the analytics file. The formatted output file is generated as a collection of display objects. Each of the display objects represent at least one mission analytic from the plurality of mission analytics. The method includes specifying a subset of the display objects to be visualized in the formatted output file. The method includes generating a mission analytics visualization output from the subset of display objects specified via the formatted output file. Each of the specified display objects represent a current or future status of the mission analytics over a specified time window.

DETAILED DESCRIPTION

This disclosure relates to dynamic visualization of performance indicators for manned and unmanned vehicles or manned and unmanned vehicle swarms over selected time periods. A dynamically generated interface visually provides mission status for current and/or alternative mission plans selected over the course of time. The status can be provided in real time for individual members of a swarm of manned and unmanned vehicles and/or provided collectively for the swarm. Example status depicted in the interface can include current and predicted fuel supply, payload action opportunities, payload action status, time of arrival until next payload action, communications availability, and weighted routing scores, among other status, for example.

The swarm display setting specifies that the display objects in a formatted output file and their respective mission analytics are to be viewed across a swarm of the plurality of unmanned vehicles. The individual display setting specifies that the display objects in the formatted output file are to be viewed with respect to a selected member of the swarm of the plurality of unmanned vehicles. A second interface selector specifies a subset of the display objects to be visualized in the formatted output file. If the swarm display setting is selected, the subset of display objects is generated having a specified analytic for each member of the swarm. If the individual display setting is selected, the subset of display objects generated represents different analytics for a selected individual member of the swarm. Each of the specified display objects represent a current or future status of the mission analytics over a specified time window.

The interface can include an analytics dashboard to enable manned and unmanned vehicle operators to rapidly conduct visual tradeoffs, between current and alternate mission plans as predicted over time. A time specifier (e.g., time slider) can be provided with the interface to enable the operator to view current and predicted future system status based on interface movement of the slider. At a glance, the dashboard displays the projected fuel, payload action opportunities, payload action status, time of arrival (TOA) to next task, communications availability, and an aggregate score for the current and alternate mission plans for example. The dashboard provides operators a complete system view to help simplify complex mission scenarios and tradeoffs between different mission plan alternatives. Interface selection options are provided to mission plan operators to enable dynamically constructing a desired view of selected mission analytics. In one example, operations can select a desired subset of mission analytics to view for a selected manned or unmanned vehicle. In another example, the operator can dynamically configure a display where a common mission analytic (e.g., task achievement) is viewed for a swarm of manned and unmanned vehicles. In yet another example of dynamic configuration, one mission analytic for a selected manned or unmanned vehicle may be viewed while concurrently viewing different analytics for one or more other manned and unmanned vehicles in the swarm.

Figure 1:
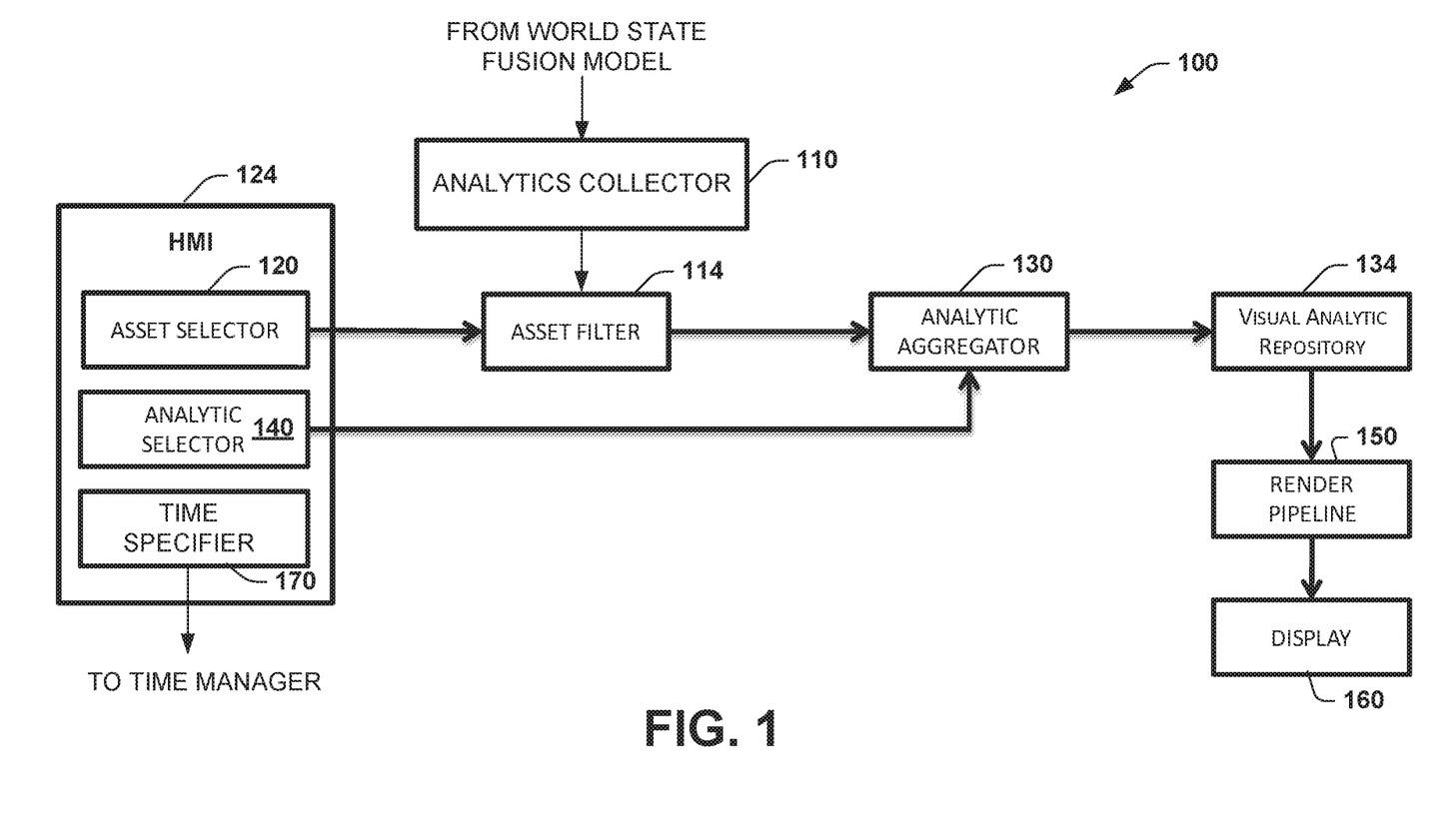
FIG. 1 illustrates a block diagram of an example system for dynamic visualization of performance indicators for manned and unmanned vehicles or manned and unmanned vehicle swarms over selected time periods.

FIG. 1 illustrates an example system 100 for dynamic visualization of performance indicators for manned and unmanned vehicles or manned and unmanned vehicle swarms over selected time periods. As used herein, the term unmanned vehicles can include unmanned ground vehicles (UGV), unmanned underwater vehicles (UUV), unmanned surface vehicles (USV), and unmanned aerial vehicles (UAV). Also, the term 4D refers to a data structure or configuration where both three-dimensional position coordinates and with time accounted for as an additional dimension (e.g., $4^{th}$ dimension) for present and/or future visualizations generated in the system. Also, the systems and components described herein can be executed as computer readable components via one or more processors that read the respective components from a non-transitory computer readable medium.

The computer-executable components include an analytics collector 110 that receives world state data to provide status relating to a plurality of mission analytics of an unmanned vehicle or an unmanned vehicle mission planner. The world state data can be received from world state fusion models such as generated at 620 of FIG. 6. The analytics collector 110 can receive derived or computed metrics, real time states, and/or projected future states for a given mission. The mission analytics relate to the ability of the unmanned vehicle (or vehicles) and its associated payload resources to execute a given mission plan. An asset filter 114 filters the status from the analytics collector 110 with respect to mission analytics of a subset of selected assets.

An asset selector 120 which is part of human machine interface (HMI) 124 specifies the subset of selected assets to the asset filter 114. An analytic aggregator 130 collects the filtered status from the asset filter 114 and generates a visual analytics file based on one or more selected analytics for the subset of selected assets. The visual analytics file can be stored in a visual analytic repository 134 which can store various analytics such as pie charts, bar graphs, alternative route displays, vehicle status, and so forth. The analytic aggregator 130 can be a rule-based engine that operates for a selected individual unmanned vehicle asset or for a selected subset of assets.

An analytic selector 140 in the HMI specifies the one or more selected analytics to the analytic aggregator 130. A rendering pipeline 150 processes the visual analytics file from the analytic aggregator 130 and generates a formatted output file describing a visualization of the plurality of mission analytics from the visual analytics file which can be displayed via display 160. The formatted output file is generated as a collection of display objects. Each of the display objects represent at least one mission analytic from the one or more selected analytics of the subset of selected assets. Each of the specified display objects represents a current or future status of the mission analytics over a specified time window which can be specified via time specifier 170 of the HMI 124.

The system 100 receive status from a plurality of status generators (See e.g., FIG. 6) to provide status relating to a plurality of mission analytics that enable mission plan operators to determine the ability of an unmanned vehicle to execute a given mission. The status generators can include status from one or more unmanned vehicles and one or more unmanned vehicle mission planners, for example. Each of the unmanned vehicles can be associated with at least one mission planner and often times associated with a plurality of mission planners for different portions of the unmanned vehicle route (e.g., one mission planner for takeoff, one mission planner for vehicle tasking, and another mission planner to return vehicle to base). The mission analytics relate to the ability of the unmanned vehicles and their respective payload resources to execute a respective mission plan and/or respective alternative mission plan generated by the unmanned vehicle mission planners.

The formatted output file to the display 160 can be generated as a collection of display objects (e.g., XML graphical objects). Each of the display objects represent at least one mission analytic from the mission analytics and related to an individual or selected subset of a swarm. For example, one display object may represent a given fuel status for a specified unmanned vehicle and another display object may represent the payload collection capability of another unmanned vehicle. An interface selector specifies a swarm display setting or an individual display setting (See e.g., FIG. 2). The swarm display setting specifies that the display objects in the formatted output file and their respective mission analytics are to be viewed across a swarm of unmanned vehicles. The individual display setting specifies that the display objects in the formatted output file are to be viewed with respect to a selected member of the swarm of the of the unmanned vehicles.

A graphical user interface (GUI) can be operated via the rendering pipeline 150 to display the mission analytics visualization output from the repository 134. The GUI provides a visualization of the display objects that represent a current or future status of the mission analytics over a specified time window as specified by a time specified. In one example, the display objects represent at least one of a fuel status for an unmanned vehicle, a payload collection opportunity (e.g., ability of a payload sensor to detect its intended sensing target) for an unmanned vehicle, or and a payload collection status (e.g., status of sensor while collecting such as resolution and number of images being collected) for an unmanned vehicle in a present or future time window as specified by the time slider. In another example, the display objects represent mission analytics from at least one of time of arrival of next payload collections for an unmanned vehicle, a communications availability for the unmanned vehicle (e.g., ability of unmanned vehicle to communicate with a given satellite), and a weighted route score for an unmanned vehicle relating to alternative routes for an unmanned vehicle. Alternative route generation and scoring are described in more detail below with respect to FIGS. 4, 5, and 8.

In one specific example, the weighted route score can be stored in a data structure that includes a route field to describe a loaded route for the unmanned vehicle. A behavior field in the data structure describes three-dimensional spatial capability of the unmanned vehicle and its resource capability along the loaded route that includes at least one of a latitude, a longitude, and an altitude parameter for the loaded route of the unmanned vehicle. A when field in the data structure describes a starting time or a duration for the loaded route of the unmanned vehicle and a starting time or a duration for deployment of the resources that drive mission plan inputs for the unmanned vehicle mission planner. Mission analytics for the alternative routes of the unmanned vehicles can be projected over time via command inputs from the time specifier 170. In yet another example, the display objects and associated analytics can represent a status from at least one of a weather prediction model for an unmanned vehicle, an unmanned vehicle tasking model, an unmanned vehicle threat detection model, and an unmanned vehicle tracking model, for example. Depending on the selections of the HMI 124, the analytic aggregator 130 receives operator input selections to dynamically specify which display objects to generate in the formatted output file. The dynamically specified display objects are specified relative to a selected unmanned vehicle or specified relative to a plurality of unmanned vehicles in a swarm, for example.

The time specifier 170 specifies time projections of the loaded route and/or alternative routes, specifies viewing of the mission analytics over time, and specify deployment of resources over time. The time specifier 170 can include a time slider graphical input to specify a current time or the future time for the visualization output on the GUI. In another example, the time specifier 170 utilizes a voice input to specify the current time or the future time for the visualization output on the GUI. Other examples include a hand or figure gesture to specify the current time or the future time or a retinal scan input to specify the current time or the future time for the visualization output on the GUI.

The analytics described herein can be projected over time for a selected unmanned vehicle and/or from a swarm of unmanned vehicles. To facilitate projections, a system as illustrated and described below with respect to FIG. 6 can be provided. The system includes a state aggregator to process input data feeds to update the behavior field of the 4D data structure described herein in real time. The data feeds include at least one of a tasking feed, a mission plan feed, a weather feed, a threat feed, a sensor feed, a tracks feed, and a communications feed, for example.

The system 100 includes a prediction engine to project the data feeds from the state aggregator into a future visualization of the loaded route, a future visualization of the resources that drive the mission plan inputs of the respective mission planners, and a future visualization of at least one alternative route for the unmanned vehicle. This includes projecting analytics for a given loaded route or alternative routes for unmanned vehicles and/or unmanned vehicle swarms over time. The system 100 can include a memory (not shown) to store computer-executable components (e.g., components 110 though 170) and instructions. A processor (not shown) executes the computer-executable components and instructions from the memory.

Figure 2:
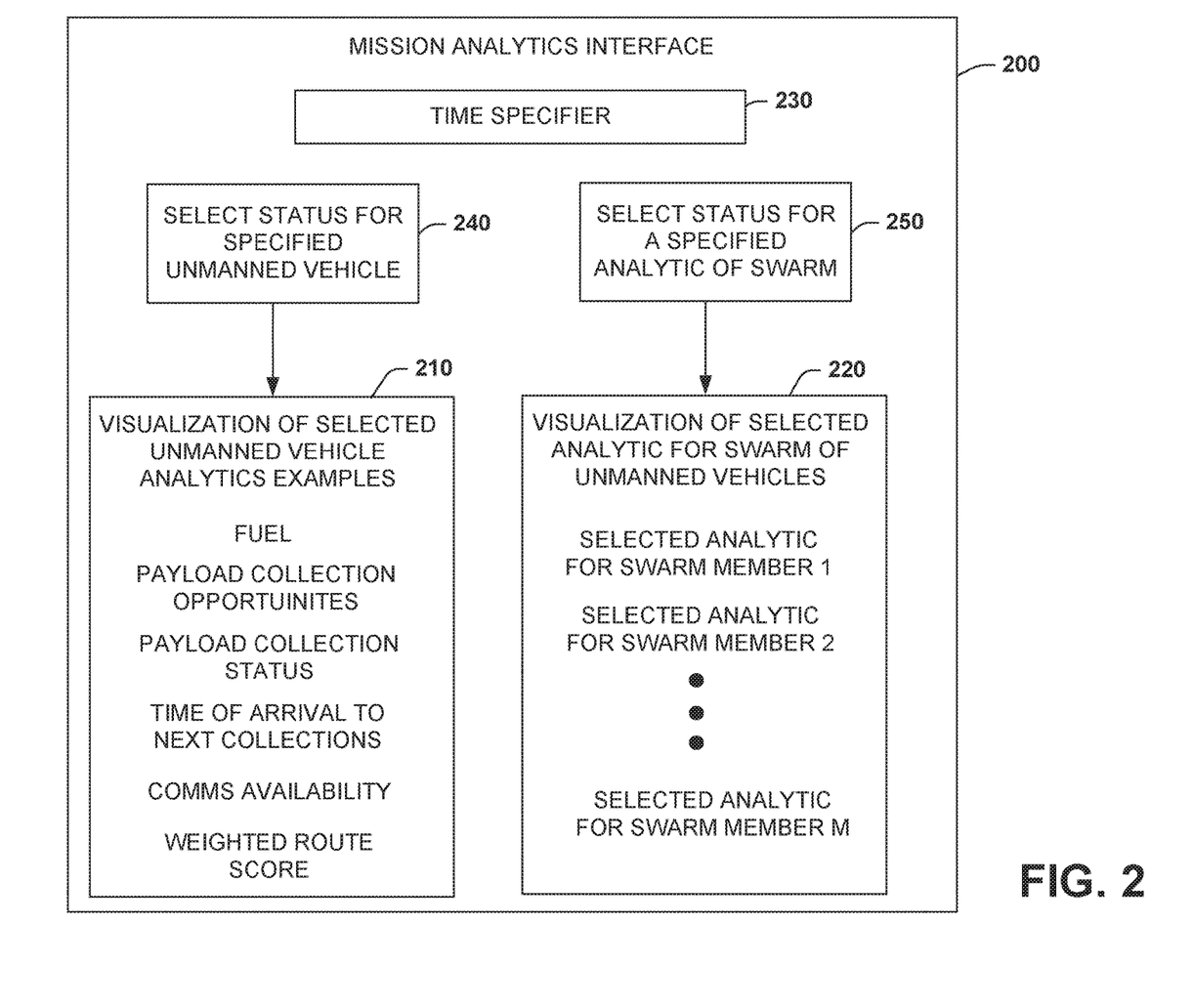
FIG. 2 illustrates an example mission analytics interface for dynamic visualization of performance indicators and switching controls for changing views between unmanned vehicles or vehicle swarms over selected time periods.

FIG. 2 illustrates an example mission analytics interface 200 for dynamic visualization of performance indicators and switching controls for changing views between unmanned vehicles or vehicle swarms over selected time periods. The mission analytics interface 200 can generate differing type of visualizations shown at 210 and 220 depending on whether individual unmanned vehicle analytics are selected or swarm analytics are selected. As will be illustrated and described below, the mission analytics output can be configured as an analytics dashboard where a collection of differing analytics (e.g., analytics related to one member or members of a swarm) can be visualized. The selected analytics can be represented as display objects in the visualizations 210 and/or 220, where each of the display objects represent at least one mission analytic from a collection of mission analytics. For example, one display object may represent a given fuel status for a specified unmanned vehicle and another display object may represent the payload collection status of another unmanned vehicle. As shown, the interface 200 can include a time specifier 230 to specify a current time status for a given analytic and/or specify a future projected status for a given analytic and as visualized via the display objects.

An interface selector 240 specifies a subset of the display objects to be visualized in the formatted output file generated by the status formatter described above. This can include selecting icons representing a selected swarm member and selection icons representing desired analytics to be viewed. The subset of display objects generated represents different analytics for a selected individual member of the swarm where its status can be viewed via visualization 210. Another selector 250 specifies that the visualization 220 is to be generated having mission analytics and status for more than one member of a swarm. If the swarm display setting is selected at 250, the subset of display objects having an associated mission analytic are generated having a specified analytic for each member of the swarm (or for each member of selected subset of swarm). In this example, the selector at 250 can include icons representing multiple members of a swarm and icons representing mission analytic status to be viewed for the respective members of the swarm. In some cases, status for the swarm can be for a common analytic across the swarm (e.g., fuel consumption of each member of the swarm) and/or status can be viewed as differing analytics for each selected member of the swarm (e.g., fuel status for one member and time of arrival for next collections status for another member).

As noted previously, the display objects in the visualization 210 represent at least one of a fuel status for an unmanned vehicle, a payload collection opportunity (e.g., ability of a payload sensor to detect its intended sensing target) for an unmanned vehicle, or and a payload collection status (e.g., status of sensor while collecting such as resolution and number of images being collected) for an unmanned vehicle in a present or future time window as specified by the time specifier 230. In another example, the display objects represent mission analytics from at least one of time of arrival of next payload collections for an unmanned vehicle, a communications availability for the unmanned vehicle (e.g., ability of unmanned vehicle to communicate with a given satellite), and a weighted route score for an unmanned vehicle relating to alternative routes for an unmanned vehicle.

In yet another example, the display objects and associated analytics can represent a status from at least one of a weather prediction model for an unmanned vehicle 114, an unmanned vehicle tasking model, an unmanned vehicle threat detection model, and an unmanned vehicle tracking model, for example. Depending on the selections of the selector 240 and/or 250, the mission analytics interface to can dynamically visualize which display objects to view for the operator. As shown at the visualization 220, when swarm status is selected at 250, one or more analytics can be visualized and shown as selected analytic for swarm member 1 though selected analytic for swarm member M, where M is a positive integer.

Figure 3:
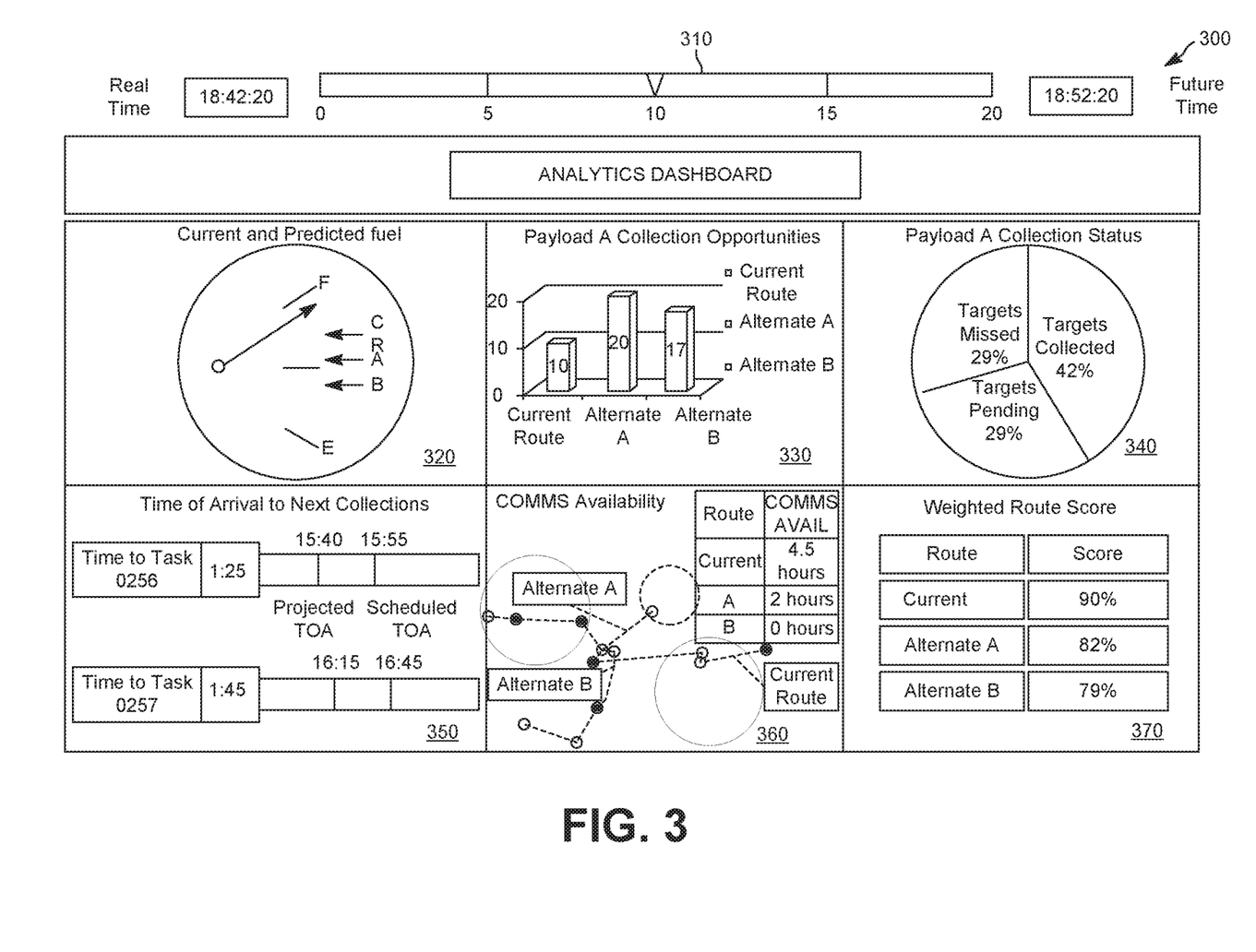
FIG. 3 illustrates an example of a mission analytics dashboard of performance indicators for manned and unmanned vehicles over selected time periods.

FIG. 3 illustrates an example of a mission analytics dashboard 300 of performance indicators for an unmanned vehicle over selected time periods. The dashboard 300 includes a time specifier 310 to specify current and/or future status for selected analytics on the dashboard 300. In this example, current and predicted fuel status for the current route of the unmanned vehicle and one or more alternative routes is shown. At 330, payload collection opportunities for a given payload are shown. In this example, alternate route A and Alternate Route B both have higher collection ability than the current route, thus the operator may decide to switch the current route to one of the alternative routes. At 340, payload collection status is displayed. These can include the number of targets collected, the number of targets pending, and the number of targets missed, for example. At 350, the time of arrival until next payload collections can be displayed for the current route and/or one or more alternative routes. This can include projections from the state aggregator and prediction engine described herein (See e.g., FIG. 6). At 360, communications availability can be displayed and or projected. This can include times when the unmanned vehicle is in proximity to a given communications asset along the current route and/or alternative routes. At 370, weighted route scores can be visualized which show scoring for the current route and/or one or more alternative routes where the score reflects the effectiveness along a given route to utilize one or more of the unmanned vehicle assets and resources (See e.g., FIG. 4 for scoring alternative routes and example FIG. 5 for managing alternative routes).

The dashboard 300 can be dynamically configurable display historical, current, and/or future unmanned vehicle mission performance indicators. The dashboard 300 represents an example of a dynamically selected subset of mission performance indicators that can be displayed to an operator if so, selected for viewing (among other analytics not shown). With a single glance, the operator can visualize analytical metrics, such as communications availability and payload collection opportunities over N number of alternate mission scenarios. It is noted that the aforementioned analytics are merely a subset of indicators that can be displayed on the analytics dashboard 300. Substantially any data objects or an aggregate of multiple data objects can be used for visualization on the dashboard 300. Thus, an operator using the analytics dashboard 300 can rapidly conduct visual tradeoffs, between the current and alternate routes, for example, along with respective analytics to gauge the efficacy of a given route. At a glance, the dashboard 300 displays the projected fuel, payload collection opportunities, probabilities of survival and detection, communications availability and an aggregate score for the current and alternate route scenarios, for example. The dashboard 300 provides the users a complete system view of selected analytics to simplify analysis of complex mission scenarios.

Figure 4:
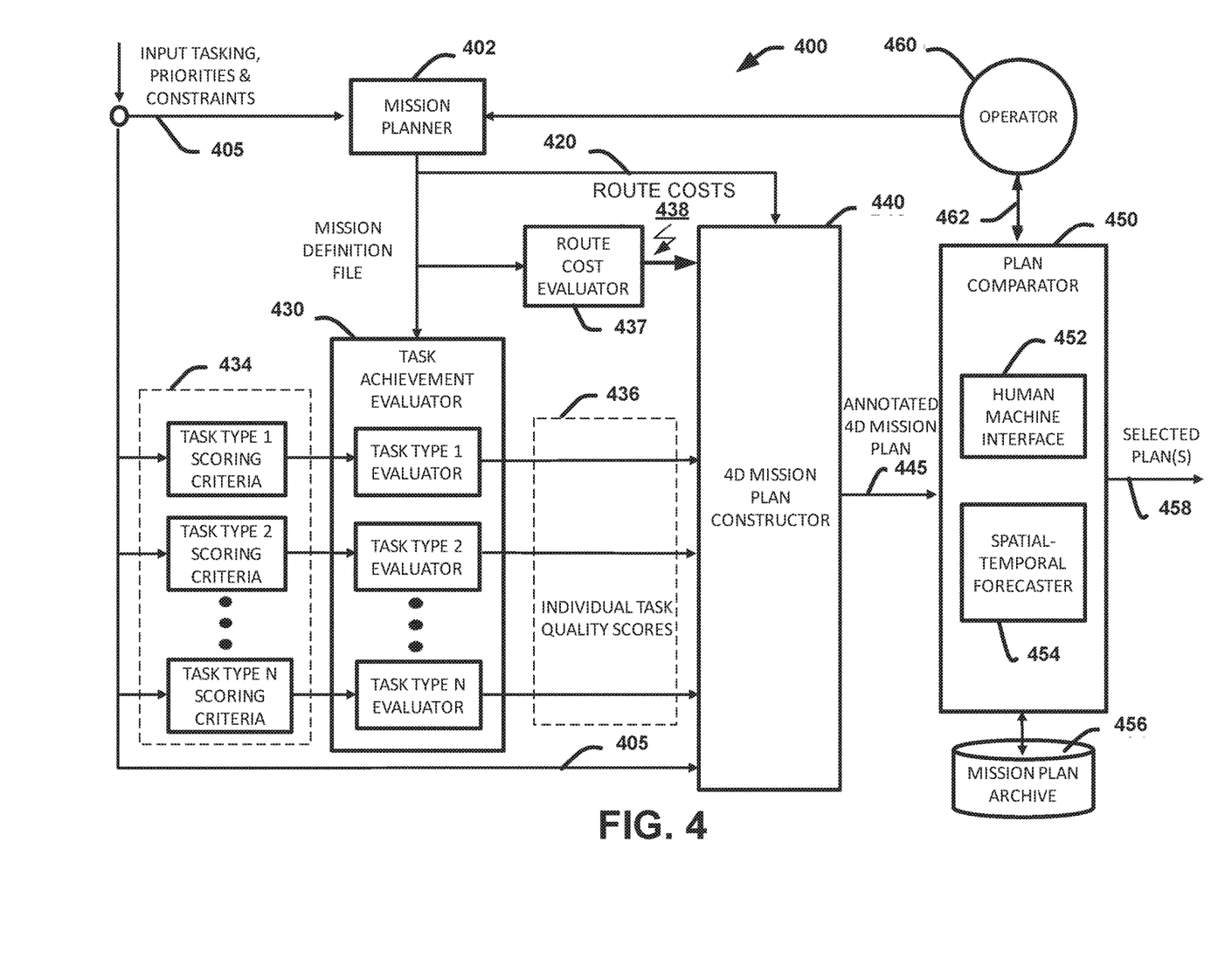
FIG. 4 illustrates an example system to dynamically evaluate mission plans for manned and unmanned vehicles over selected current or future time periods.

FIG. 4 illustrates an example system 400 to dynamically evaluate mission plans for unmanned vehicles over selected current or future time periods. The system 400 employs at least one external mission planner 402 that processes one or more mission plan inputs 405 and generates a mission definition file (MDF) 420 that includes mission data that describes one or more tasks and routes for one or more vehicles. As shown, the mission plan inputs 405 can also include task priorities and constraints. The system 400 includes a task achievement evaluator 430 that employs a plurality of evaluation engines, shown as task type evaluator 1 though N, where N is a positive integer, to evaluate each planned task contained in the MDF with respect to its respective task type scoring criteria 434 to generate individual task quality scores 436 representing an expectation of how well the planned task will be executed. Task type scoring criteria 434 are defined generically for each type of task planned and may be further constrained by optional inputs accompanying the tasking 405. For example, the general task type scoring criteria 434 for an image collection task may include items such as image target location and a required image quality whereas the general task type scoring criteria for an area search task may include a time of arrival, search duration, and geographical area within which to search.

For a specific image collection task, for example, the specific criteria 434 can specify the latitude, longitude, and elevation of the desired imaging target and a NIIRS 7 (National Imagery Interpretability Rating Scale level 7) as the image quality requirement. In addition, a route cost evaluator 437 evaluates the cost of each route 438 contained in the MDF 420. Route costs can be defined as time spent, fuel consumed, amounts of other consumables used, or threats to vehicle safety, for example.

The system 400 also includes a 4D mission plan constructor 440 that constructs a 4D data structure 445 making time an explicit parameter in combination with; the input mission plan 420; individual route costs 438; individual task quality scores 436; and the original input tasking, task priorities, and constraints 405. The 4D mission plan constructor 440 also reviews and annotates the 4D mission plan identifying portions of the plan that may need operator attention. This process is performed for at least the primary mission plan and all optional plan alternatives contained within the MDF 420. An annotated 4D mission plan 445 is output by the constructor 440 use by a plan comparator 450.

The data structures 445 can be expressed as a multidimensional tuple (e.g., What, <Behavior, When>) and configured as a graph. The "What" argument of the data structure 445 provides the labeled route and uniquely identifies it (e.g., primary route, contingency route, optional branch, and so forth). The "Behavior" argument provides the 3D spatial capability (e.g., <latitude, longitude, altitude>, heading, speed, fuel remaining) and the "When" argument provides the temporal capability (e.g., start time, time of arrival, and/or time tolerance (+/−minute window)). The data structure 445 and generated visualizations described herein empowers operators to conduct "What-If" scenarios of multiple assets across multiple routes by significantly reducing the burden of complexity for the operator. Effectively, this capability enables operators to rapidly conduct visual tradeoffs for unmanned systems, manned systems, and manned-unmanned teams, for example. Each Behavior field is associated with a When field, expressed as a starting time and/or duration. Also, any path in the graph data structure for the visualization can be represented as a sorted linked list, for example, representing a primary unmanned vehicle route and any alternative routes. In one example, the 4D mission plan constructor 440 employs a sorted linked list to represent the primary route and the alternative route and to generate a fused visualization of the primary route and the alternative route on a human machine interface (HMI) 452 of the plan comparator 450.

The plan comparator 450 enables an operator 460 to directly compare 462 alternative mission plans 445 against each other, via the HMI 452, identifying poor performing segments of each plan that may need adjustment or selecting a specific plan option that is more desirable than the other options. For example, the quality of planned image collections may be better in one plan option than another. For multiple vehicles, the plan comparator 450 provides functions that identify areas of conflict between plans as well as opportunities for collaboration between vehicles. The HMI includes a Graphical User Interface (GUI) that provides interactive visualizations to the operator. These visualizations can be generated for current or future time periods specified by the operator via a time selector embedded in the GUI. A spatial-temporal forecaster 454 in the plan comparator 450 generates predictions of the current and future states of the mission for the GUI to visualize based on the current time or the future time specified by the time selector. The plan comparator 450 also stores the plans and plan segments into an archive 456 for later retrieval and reuse. If additional plan alternatives are desired, the operator 460 makes adjustments to the input parameters of the mission planner 402 requesting generation of additional plan options 420. The internal functions of the plan comparator 450 can be manual, semi-automated, or fully automated as needed. The output of the plan comparator 450 is a selected mission plan for a single vehicle, a set of selected plans for a single vehicle, or a set of selected plans for multiple vehicles shown at 458.

Figure 5:
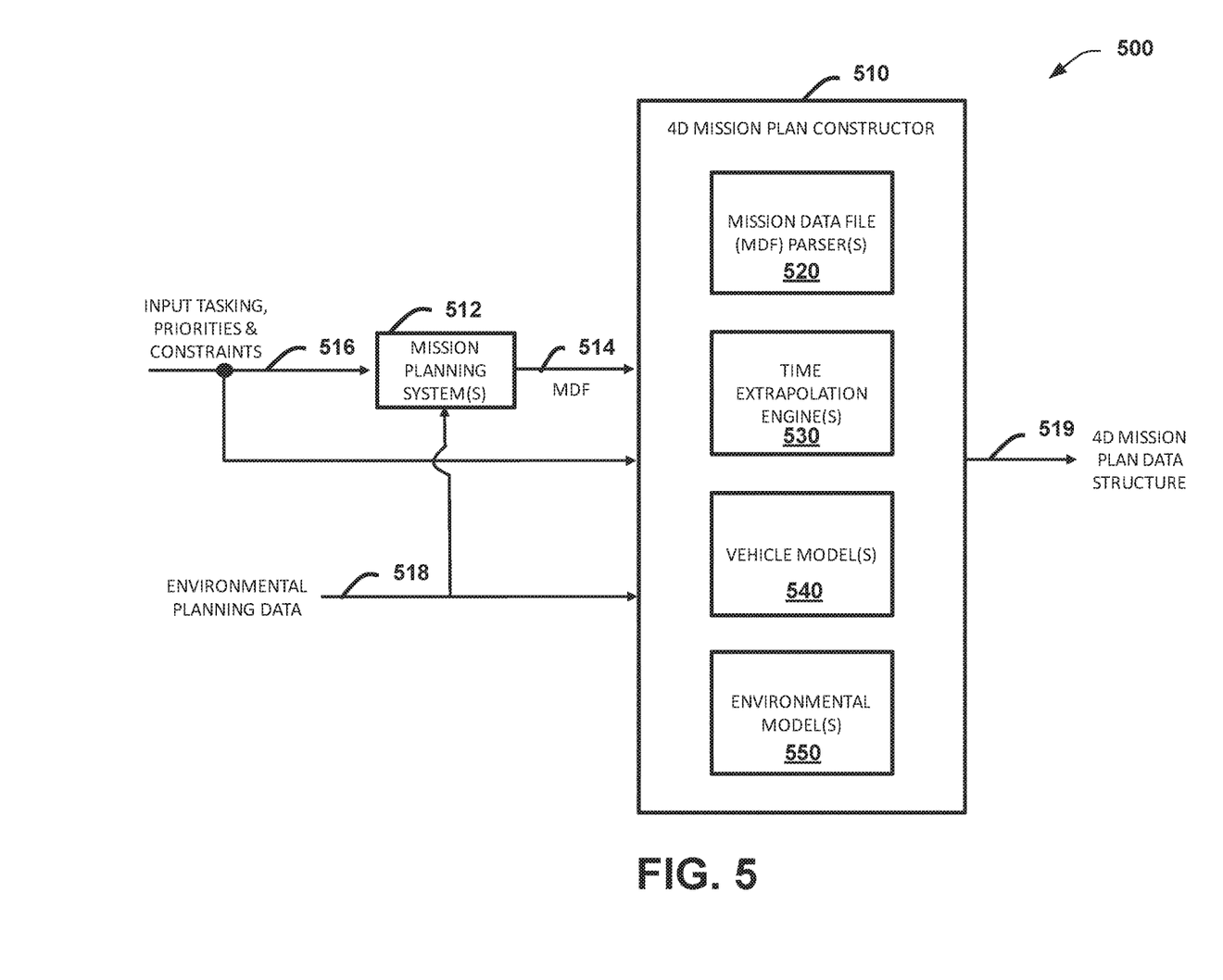
FIG. 5 illustrates an example system to provide alternative visualizations from a given route of manned and unmanned vehicles utilizing 4D temporal data structures.

FIG. 5 illustrates a system 500 to provide alternative visualizations from a given route of an unmanned vehicle utilizing 4D temporal data structures. The system 500 includes two or more cooperating modules to generate the temporal data structures described herein. These modules include a 4D mission plan constructor 510 and at least one independent mission planning system 512 that generates one or more mission plans for one or more vehicles. The output of the mission planning system 512 is a Mission Data File (MDF) 514 that includes at least one primary mission plan for at least one vehicle. The MDF 514 may include multiple mission plan alternatives, including contingency plans that account for various vehicle failure scenarios, in addition to the primary mission plan. In another example, there may exist multiple independent mission planning systems 512 each producing one or more mission plans and alternatives for one or more vehicles of various types and in various domains (e.g., land, sea, air, space).

Each mission planning system 512 generates its plans driven by input tasking 516 provided by an external entity. For military operations, tasking inputs 516 may come from a central command authority while for commercial operations, tasking may come from a central or distributed order processing system. In most examples, specific tasking 516 is specified to the mission planning system 512 along with associated tasking priorities and optional additional tasking constraints. Execution timing is often an additional constraint placed on input tasking requests 516 and can take the form of specifying a No-Sooner-Than (NST) time of arrival, a No-Later-Than (NLT) delivery of a package, or a fixed time window within which a task may only be performed including both NST and NLT constrained situations.

In addition to tasking requests, priorities, and constraints 516, environmental planning data 518 is also used by the mission planning system 512 when generating a mission plan. Environmental planning data 518 can include orbital models and gravitational field models for space vehicles, wind velocity vectors, air temperature, and pressure for air vehicles, sea state and sea currents for sea surface vehicles, sea temperature and currents for undersea vehicles, and/or terrain models and road networks for ground vehicles, for example.

The 4D mission plan constructor 510 of system 500 uses the input tasking, priorities and constraints 516, the environmental planning data 518, along with the mission plans contained in the mission data files 514 output by the one or more mission planning systems 512 to construct 4D mission plan data structures 519. The mission data contained within the MDF 514 is parsed by one or more MDF parsers 520. Since each independent mission planning system 512 will likely output a different MDF format, the MDF parser 520 can parse each of the formats (e.g., via mapping tables that map one MDF data entry to a common data format). As the mission data is parsed from the MDF 514, an initial 4D data structure is populated with the mission data that exists.

Since conventional mission planners 512 do not output time as an explicit parameter of their mission plans, time extrapolation engines 530 can be employed to estimate the intermediate times of arrival for vehicles from a current location or waypoint to a subsequent location or waypoint. These engines 530 can include but are not limited to, Kalman filters, Markov filters, Particle filters, Runga-Kutta, Predictor-Corrector, and so forth, for example. The time extrapolation engines 530 can employ vehicle models 540 and environmental models 550 as needed. Vehicle models 540 are vehicle specific and model the physical ability of the vehicle to move over time. Environmental models 550 model environmental effects on vehicle movement. For example, a wind forecast model consisting of wind direction and velocity at mission time in the mission area can be used together with a vehicle model 540 by the time extrapolation engine 530 to estimate times of arrival of a specific air vehicle traveling on its planned route. A system for updating such environmental vehicle models is illustrated and described below with respect to FIG. 6.

After completing the estimation of the timing parameters in the 4D mission plan data structure 519, the 4D mission plan constructor 510 adds in the timing constraints specified in the input tasking 516 to the data structure. While not every task in the mission plan will have a timing constraint, those that do can be incorporated into the 4D data structure 519. After completing adding the timing constraints to the 4D data structure, the 4D mission plan data structure 519 is output from the 4D mission plan constructor 510 where it can be employed to generate visualizations of alternative plans for analysis as described herein.

Figure 6:
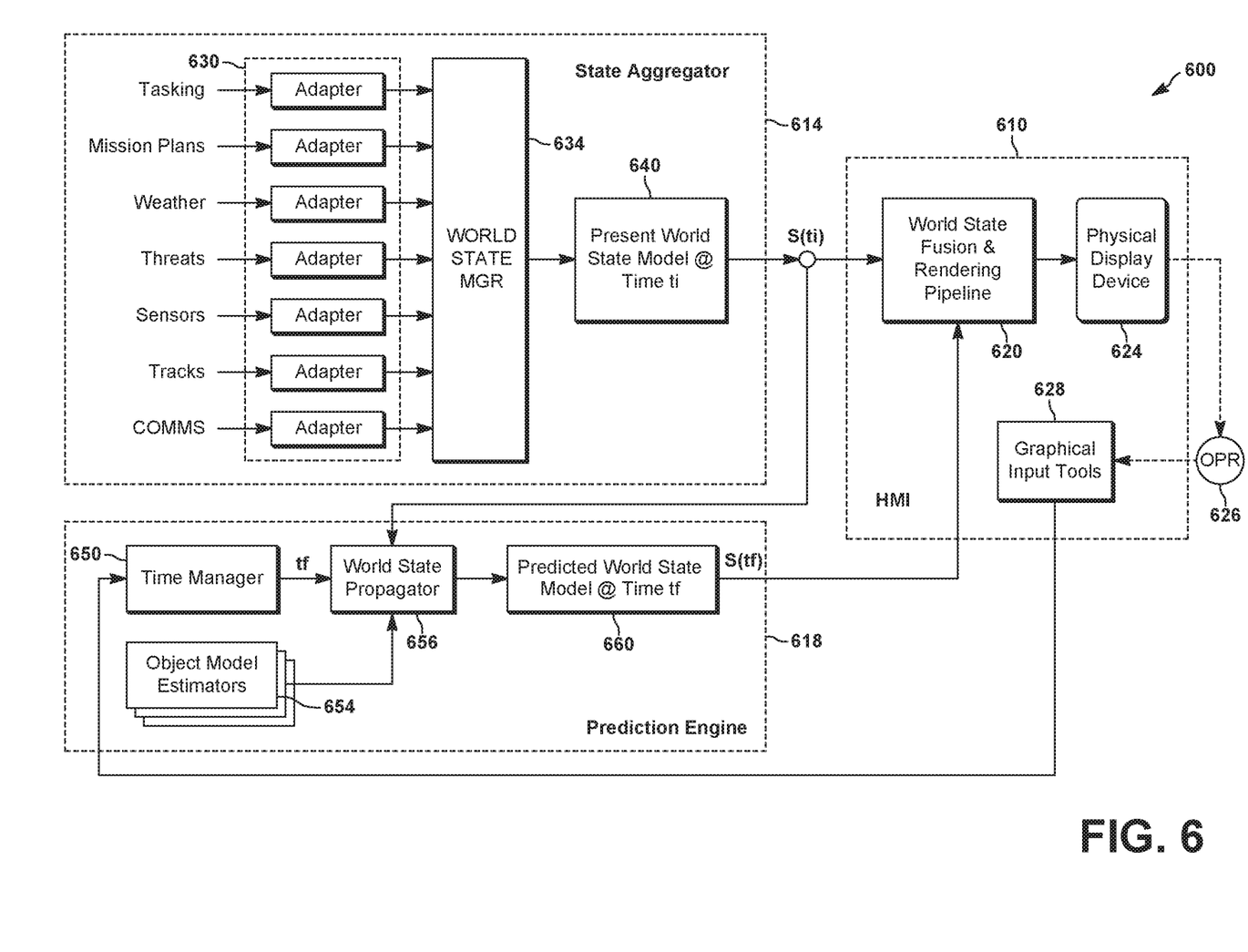
FIG. 6 illustrates a schematic diagram of an example system to provide spatial and temporal forecasting for predictive situation awareness of manned and unmanned vehicles and to update contingent data within temporal data structures.

FIG. 6 illustrates a schematic diagram of an example system 600 to provide spatial and temporal forecasting for predictive situation awareness of unmanned vehicles and to update contingent data within temporal data structures described herein. The system 600 provides a more detailed aspect to the system 100 described above. The system 600 includes a human machine interface (HMI) 610, a state aggregator 614, and a prediction engine 618. The HMI 610 includes a world state rendering pipeline 620 to generate visualizations to an output device 624 that can be viewed by an operator 626. A graphical input 628 can be used by the operator to operate a time slider to specify current or future times for visualization renderings at the display 624.

The state aggregator 614 receives and processes the various data feeds that constitute a mission. It is generally always on and is processing in real time. It provides the current world state to the HMI 610 and the prediction engine 618. The HMI 610 provides situational awareness in real time of the current world state and can provide fused visualizations of the current world state and alternative future world states. The HMI 610 also includes graphical tools 628 to allow an operator to control the prediction engine 618 enabling the generation of alternative plans projected into the future. The prediction engine 618 has access to the current world state, alternative plans, and receives operator inputs to project the current world state and alternative plans to some point in the future. The prediction engine 618 provides the projected future world state and any projected alternatives to the HMI 610 for fusion and display to the operator 626.

The state aggregator 614 includes static and real-time data feeds that constitute a mission and are received via adapter modules 630 which are processed via world state manager 634. The data feeds can include a mission plan. This data feed originates from various mission planning engines in various formats, and includes the primary route and contingency routes for each platform. Furthermore, it includes the state of a platform (position, velocity, orientation, fuel, and so forth) at periodic increments. This is true for each unmanned vehicle platform along the primary route and contingency routes.

A tasking data feed originates external to the system in various formats and consists of actions to perform. These actions may include Intelligence Surveillance and Reconnaissance (ISR) collections, strike (both kinetic and electronic), communications relay, and the delivery of a payload such as fuel or supplies. Tasking can have constraints that may include a time window within which the action must take place; a location where the action must be performed; and detailed geometric constraints that may include azimuth, elevation, and velocity with respect to the tasking, for example. A weather data feed originates external to the system in various formats and consists of information pertaining to winds, currents, cloud coverage, temperature, humidity, and precipitation. Weather feeds include both current measurements and forecasted conditions.

A threats data feed originates external to the system in various formats and includes threat information (e.g., type of threat, location, and range of threat effectiveness). Threats may also include environmental obstacles such as terrain, bodies of water, icebergs, and cultural obstacles such as power lines, buildings, and towers. A tracks data feed originates external to the system in various formats and includes track information (e.g., entity type, hostile/friendly, location, velocity, orientation). A sensors data feed is per payload type for each asset and consists of data for field of view and field of regard data on position and orientation of the sensor. A COMMS data feed provides they type of communications asset available and its current and planned footprint over time.

Because each of the data feeds delineated above has multiple formats and can change in real-time, and independently of one another, adapters 630 have been created to mediate the various data types to an internal standardized data model managed by the world state manager 634. The world state manager 634 has the responsibility to aggregate the disparate data feeds into a single internal representation and at a single point in time as well as store and manage the internal data model. By extension, other inputs and data feeds may also be aggregated into the internal data model as needed through additional adapters 630.

At a particular time, instance, t(i), the aggregation of all the data as captured constitutes the present world state 640 which can be utilized to update contingency data within the data structures described herein (e.g., via the behavior fields). This present world state 640 is updated in real time and, at a minimum, is updated at a 1 Hz rate, for example.

The present world state snapshot is made available to the HMI's fusion and rendering pipeline component 620 which automatically renders the state onto a physical display device for the operator 626 to view. The present world state 634 is also provided to the prediction engine 618 for propagation into some future time t(f) specified by the operator.

As noted above, the HMI 610 includes the world state fusion & rendering pipeline 620 which is an event driven component that receives world state updates or changes made by the state aggregator 614 to the present world state 614. It also has the responsibility of fusing the current world state with future world state generated by the prediction engine 618 and rendering the resultant fused information onto the physical display device 624 for the operator 626 to view. The graphical input tools 628 houses graphical components that take inputs from an operator 626. A notional example of an input tool is a timeline slider. This input component displays current time, which is always moving forward, and a future time, which is calculated by an offset that is determined by the operator through sliding a marker along the timeline, in one example. When the operator 626 requests a projection of the world state by method of a graphical input tool 628, the present world state 640 and the offset time are passed into the prediction engine 618 which responds with a projection of the present world state 640 and its alternatives into the specified future point in time S(t(f)) where S is the project state at future time t(f).

The prediction engine 618 includes a time manager 650 that is the master time manager for all visual components of interest. It maintains a master wall clock and a real-time clock for each platform and entity of interest. When it receives an offset time instance, it calculates a future clock instance by adding the real-time (current time) to the offset time for each platform or entity of interest. Since real time consistently moves forward, the time manager 650 has the added responsibility of determining how long the projected state is valid for. After the valid time period has expired, the time manager 650 notifies the system that the projected future world state is no longer valid and that a new projection is required.

One or more object model estimators (or predictors) 654 can be provided as a plug-in framework for creating, loading, and managing behavioral models. These models have a one to one correspondence to the data feeds coming into the state aggregator 614. Each object model estimator 654 includes methods and constraints specific to its associated data feed for projecting that particular data feed into the future. Such methods may include a family of prediction and interpolation algorithms that are appropriate for each respective object behavioral model. The prediction algorithms can include, but are not limited to, Kalman filters, Markov filters, Particle filters, Runga-Kutta, Predictor-Corrector, and so forth.

A world state propagator 656 processes an offset time, current state, and the appropriate object model estimators, and propagates them from the present state to a specified future state. This component 656 conducts this action for each object model. Upon completion of all the models, the predicted world state is aggregated at 660 and sent to the world state fusion & rendering pipeline 620 for display at 624. Output from the predicted world state at 660 can also be utilized to update contingency data within the data structures described herein (e.g., via the behavior fields).

Figure 7:
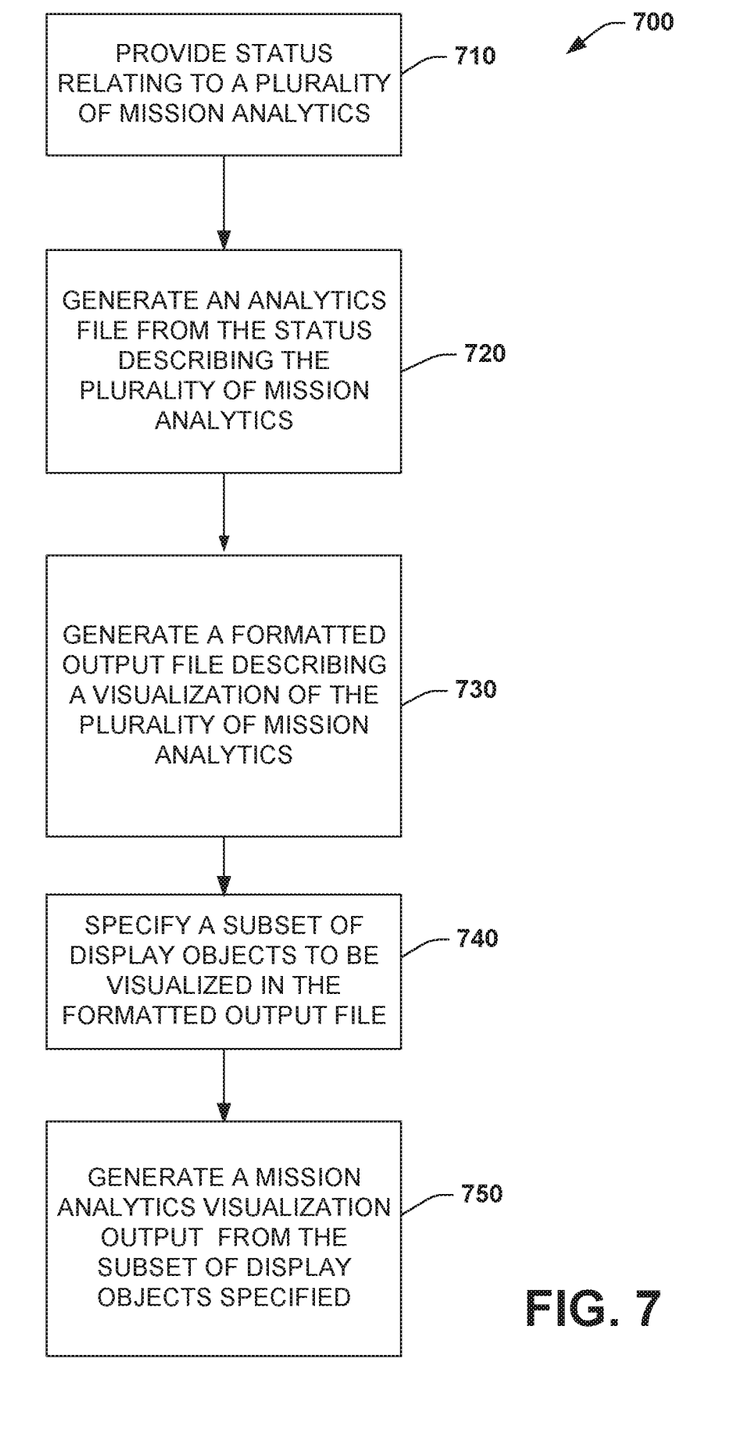
FIG. 7 illustrates an example method to generate dynamic visualization of performance indicators for manned and unmanned vehicles or manned and unmanned vehicle swarms over selected time periods.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 7 illustrates an example method 700 to generate dynamic visualization of performance indicators for unmanned vehicles or vehicle swarms over selected time periods. At 710, the method 700 includes providing status relating to a plurality of mission analytics of an unmanned vehicle or an unmanned vehicle mission planner (e.g., via status generators 110 of FIG. 1). The mission analytics relate to the ability of the unmanned vehicle and its associated payload resources to execute a given mission plan. At 720, the method 700 includes generating an analytics file from the status describing the plurality of mission analytics (e.g., via status aggregator 120 of FIG. 1). At 730, the method 700 includes generating a formatted output file from the analytics file describing a visualization of the plurality of mission analytics from the analytics file (e.g., via status formatter 130 of FIG. 1). The formatted output file can be generated as a collection of display objects.

Each of the display objects represents at least one mission analytic from the plurality of mission analytics. At 740, the method 700 includes specifying a subset of the display objects to be visualized in the formatted output file (e.g., via selector 140 and/or 150 of FIG. 1). At 750, the method 700 includes generating a mission analytics visualization output from the subset of display objects specified via the formatted output file (e.g., mission analytics output generator 160 of FIG. 1). Each of the specified display objects represents a current or future status of the mission analytics over a specified time window (e.g., via time specifier 190 of FIG. 1). Although not shown, the method 700 can also include projecting mission analytics for alternative routes for an unmanned vehicle or an unmanned vehicle swarm over the specified time window.

Figure 8:
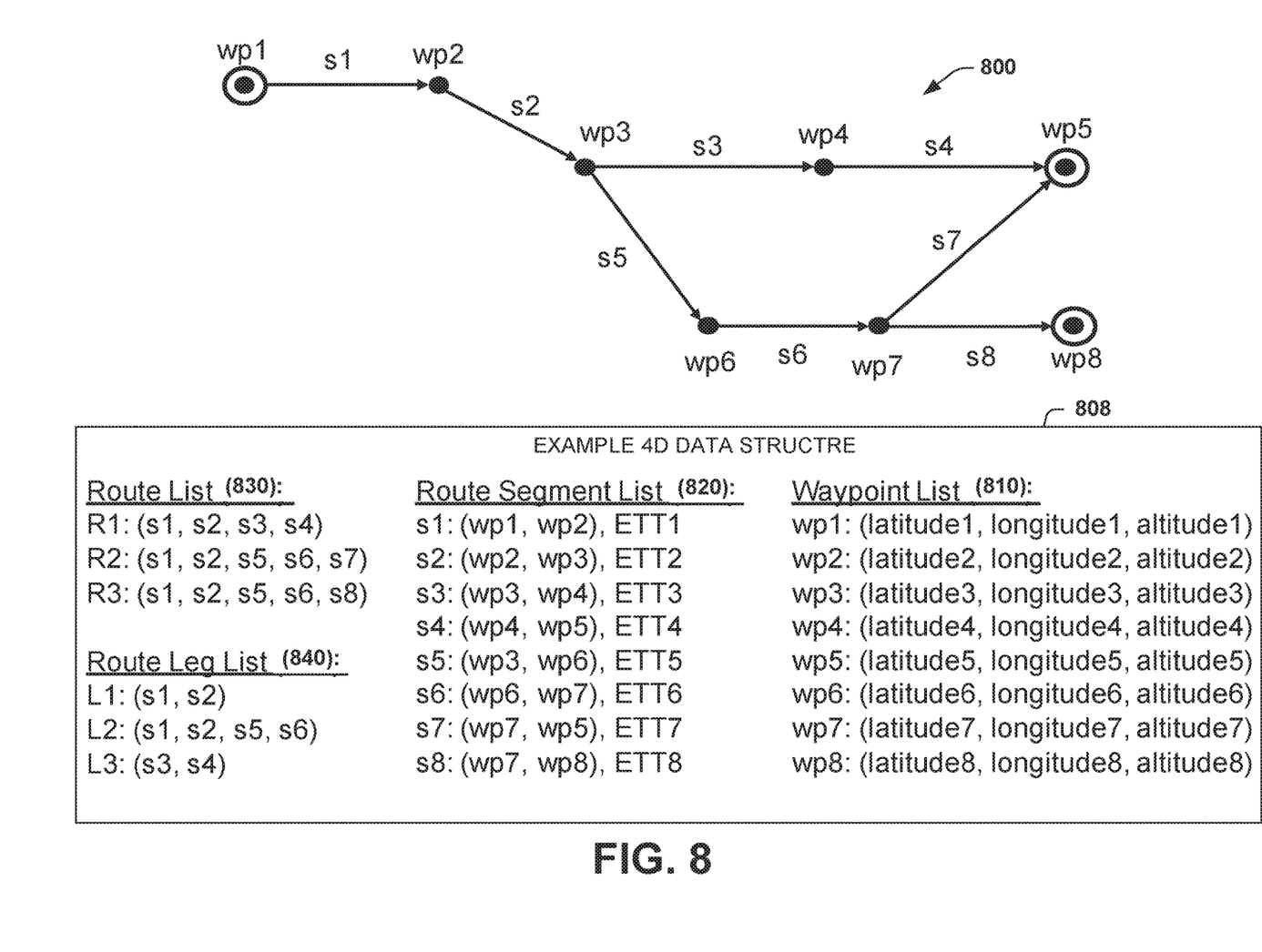
FIG. 8 illustrates an example of the network topology and estimated timing parameters of a 4D data structure.

FIG. 8 illustrates an example of the network topology 800 and estimated timing parameters of a 4D data structure 808. It is noted that the network topology 800 illustrated is merely one specific example for illustrative purposes. Numerous other network topologies are possible in accordance with the present disclosure. The network topology 800 can be visualized via graphical user interface (not shown) that plots alternative mission plans via the temporal data structures described herein. The network topology of 800 shows a set of waypoints labeled wp1 through wp8. Waypoint wp1 is the start of the network and waypoints wp5 and wp8 are terminating waypoints. The waypoints are specified in a waypoint list 810 as a tuple wherein each waypoint has a specified 3D location (latitude, longitude, and altitude). The waypoints of the network 800 are connected by route segments labeled s1 through s8 and are specified on a route segment list 820. Each route segment of 820 is defined as a directed path between two waypoints and an Estimated Transit Time (ETT). The route segment direction is determined in the order of the waypoints defined. For example, route segment s1 of list 820 is a directed segment from wp1 to wp2 with an estimated transit time (ETT) of ETT1.

The network topology of 800 defines three routes in this example: R1, R2, and R3, however more or less routes are possible. Each route is specified in a route list 830 by an ordered list of route segments. The routes specified in the route list 830 consist of at least one primary route and optional alternative routes that can be contingency routes or simple alternatives to the primary plan should certain conditions become satisfied during mission execution. In the example of FIG. 8, route R1 could represent the primary route consisting of the ordered segments s1, s2, s3, s4. These ordered segments specify the ordered waypoint destinations wp1, wp2, wp3, wp4, and terminating at wp5. In this example, route R2 of the route list 830 could represent a mission plan alternative that would be chosen for execution should certain conditions become true during mission execution. Route R2 specifies ordered route segments s1, s2, s5, s6, and s7 ending at the same terminating waypoint wp5 as the primary route R1. Finally, route R3 of 830 could represent a contingency route that would be chosen for execution should certain conditions become true during mission execution. Route R3 specifies ordered route segments s1, s2, s5, s6, and s8 ending at a different terminating waypoint wp8 that could represent the contingency recovery location for the vehicle, for example. Estimated times of arrival (ETA) for each waypoint is calculated by the route traversed to arrive at that waypoint. For example, the ETA for waypoint wp5 is different for route R1 than for route R2 which traverses different segments to arrive at the respective location.

Another construct of the network topology 800 is a route leg list 840. The route leg list 840 enables the specification of portions of the network topology 800 that represent specific activities of the mission plan that the operator wants to pay additional attention to and perhaps perform additional analysis of. In the example of FIG. 8, route leg L1 specifies segments s1 and s2 which are common to every other option in the plan. Route leg L2 specifies segments s1, s2, s5, and s6 which define the optional plan leg up to the decision waypoint wp7 where the decision must be made to either complete the optional mission plan and terminate at waypoint wp5, or execute the contingency plan and terminate at waypoint wp8, for example.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a memory to store computer-executable components; and
   a processor to execute the computer-executable components from the memory, the computer-executable components comprising:
   an analytics collector that receives world state data to provide status relating to a plurality of mission analytics of a plurality of unmanned vehicles;
   an asset filter to filter the status from the analytics collector with respect to mission analytics of a subset of selected assets corresponding to a subset of unmanned vehicles of the plurality of unmanned vehicles;
   an analytic aggregator to collect the filtered status from the asset filter and to generate a visual analytics file based on selected mission analytics of the plurality of mission analytics for the subset of unmanned vehicles; and
   a rendering pipeline to process the visual analytics file from the analytic aggregator and to generate a formatted output file describing a visualization of the plurality of mission analytics from the visual analytics file, the formatted output file generated as a collection of display objects, wherein the display objects include a first display object that represents at least one mission analytic of the selected mission analytics for a first unmanned vehicle of the subset of unmanned vehicles and a second display object that represents at least one mission analytic of the selected mission analytics for a second unmanned vehicle of the subset of unmanned vehicles different from the at least one mission analytic for the first unmanned vehicle.

2. The system of claim 1, further comprising a graphical user interface (GUI) to display the first and second display objects of the display objects from the formatted output file concurrently on a display, wherein the first and second display objects represent a current or future status of the at least one mission analytic over a specified time window.

3. The system of claim 2, wherein the at least one mission analytic for each of the first and second unmanned vehicles represent at least one of a fuel status for an unmanned vehicle, a payload collection opportunity for the unmanned vehicle, and a payload collection status for the unmanned vehicle in a future time window.

4. The system of claim 2, wherein the at least one mission analytic for each of the first and second unmanned vehicles represent at least one of time of arrival of next payload collections for an unmanned vehicle, a communications availability for the unmanned vehicle to communicate with a given satellite along a current route relative to alternative routes for an execution of a mission, and a weighted route score for the unmanned vehicle relating to the current route and the alternative routes for the unmanned vehicle.

5. The system of claim 4, wherein the weighted route score is stored in a data structure comprising:
   a route field to describe a loaded route for the unmanned vehicle;
   a behavior field to describe three-dimensional spatial capability of the unmanned vehicle and its resource capability along the loaded route that includes at least one of a latitude, a longitude, and an altitude parameter for the loaded route of the unmanned vehicle; and
   a when field that describes a starting time or a duration for the loaded route of the unmanned vehicle and a starting time or a duration for deployment of the resources that drive mission plan inputs for an unmanned vehicle mission planner.

6. The system of claim 4, wherein mission analytics for the alternative routes are projected over time.

7. The system of claim 2, wherein the display objects represent a status from at least one of a weather prediction model for an unmanned vehicle, an unmanned vehicle tasking model, an unmanned vehicle threat detection model, and an unmanned vehicle tracking model.

8. The system of claim 2, wherein the display objects are specified relative to the subset of unmanned vehicles in a swarm.

9. The system of claim 5, further comprising a time specifier to specify time projections of the loaded route, specify viewing of the plurality of mission analytics over time, and specify deployment of resources over time, the time specifier comprises a time slider graphical input to specify a current time or the future time for the visualization output on the GUI, a voice input to specify the current time or the future time for the visualization output on the GUI, a hand or figure gesture to specify the current time or the future time for the visualization output on the GUI, or a retinal scan input to specify the current time or the future time for the visualization output on the GUI.

10. The system of claim 5, further comprising a state aggregator to process input data feeds to update the behavior field of the data structure in real time, the data feeds include at least one of a tasking feed, a mission plan feed, a weather feed, a threat feed, a sensor feed, a tracks feed, and a communications feed.

11. The system of claim 10, further comprising a prediction engine to project the data feeds from the state aggregator into a future visualization of the loaded route, a future visualization of the resources that drive the mission plan inputs, and a future visualization of at least one alternative route for the unmanned vehicle.

12. A non-transitory computer readable medium having computer executable instructions stored thereon, the computer executable instructions to:
  provide status relating to a plurality of mission analytics of a plurality of unmanned vehicles and a plurality of unmanned vehicle mission planners, the plurality of mission analytics relate to the ability of the plurality of unmanned vehicles and their respective payload resources to execute a respective mission plan or a respective alternative mission plan generated by the plurality of unmanned vehicle mission planners;
  filter the status with respect to mission analytics of a subset of selected assets corresponding to a subset of unmanned vehicles of the plurality of unmanned vehicles;
  collect the filtered status from the asset filter and generate a visual analytics file based on selected mission analytics of the plurality of mission analytics for the subset of unmanned vehicles; and
  process the visual analytics file and to generate a formatted output file describing a visualization of the plurality of mission analytics from the visual analytics file, the formatted output file generated as a collection of display objects, the display objects including a first display object that represents at least one mission analytic of the selected mission analytics for a first unmanned vehicle of the subset of unmanned vehicles and a second display object that represents at least one mission analytic of the selected mission analytics for a second unmanned vehicle of the subset of unmanned vehicles different from the at least one mission analytic for the first unmanned vehicle.

13. The computer readable medium of claim 12, further comprising instructions to display the first and second display objects of the display objects from the visual analytics file, the instructions provide a visualization of the first and second display objects of the display objects that represent a future status of the selected mission analytics over a specified time window.

14. The computer readable medium of claim 13, wherein the at least one mission analytic for each of the first and second unmanned vehicles represent at least one of a fuel status for an unmanned vehicle, a payload collection opportunity for the unmanned vehicle, and a payload collection status for the unmanned vehicle in a present or future time window.

15. The computer readable medium of claim 13, wherein the at least one mission analytic for each of the first and second unmanned vehicles represent at least one of time of arrival of next payload collections for an unmanned vehicle, a communications availability for the unmanned vehicle to communicate with a given satellite along a current route relative to alternative routes for an execution of a mission, and a weighted route score for the unmanned vehicle relating to the current route and the alternative routes for the unmanned vehicle.

16. The computer readable medium of claim 15, wherein the weighted route score is stored in a data structure comprising:
  a route field to describe a loaded route for the unmanned vehicle;
  a behavior field to describe three-dimensional spatial capability of the unmanned vehicle and its resource capability along the loaded route that includes at least one of a latitude, a longitude, and an altitude parameter for the loaded route of the unmanned vehicle; and
  a when field that describes a starting time or a duration for the loaded route of the unmanned vehicle and a starting time or a duration for deployment of the resources that drive mission plan inputs for a respective unmanned vehicle mission planner.

17. The computer readable medium of claim 15, wherein mission analytics for the alternative routes are projected over time.

18. The computer readable medium of claim 13, wherein the display objects represent a status from at least one of a weather prediction model for an unmanned vehicle, an unmanned vehicle tasking model, an unmanned vehicle threat detection model, and an unmanned vehicle tracking model.

19. A computer implemented method, comprising:
  providing status relating to a plurality of mission analytics of a plurality of unmanned vehicle or a plurality of unmanned vehicle mission planners, the plurality of mission analytics relate to the ability of a respective unmanned vehicle of the plurality of unmanned vehicles and its associated payload resources to execute a given mission plan;
  generating an analytics file from the status describing the plurality of mission analytics;
  generating a formatted output file from the analytics file describing a visualization of the plurality of mission analytics from the analytics file, the formatted output file generated as a collection of display objects, each of the display objects represent at least one mission analytic from the plurality of mission analytics; and
  generating a mission analytics visualization output from a subset of display objects of the display objects specified via the formatted output file, the subset of display objects including a first display object that represents at least one mission analytic of the plurality of mission analytics for a first unmanned vehicle of the plurality of unmanned vehicles and a second display object that represents at least one mission analytic of the plurality of mission analytics for a second unmanned vehicle of the plurality of unmanned vehicles different from the at least one mission analytic for the first unmanned vehicle.

20. The method of claim 19, projecting mission analytics for alternative routes for an unmanned vehicle or an unmanned vehicle swarm over a specified time window.

\* \* \* \* \*